US012725227B2

(12) United States Patent
Li et al.

(10) Patent No.: US 12,725,227 B2
(45) Date of Patent: Sep. 1, 2026

(54) SCANNING METHOD AND APPARATUS BASED ON IMAGE-LASER FUSION LIDAR SYSTEM

(71) Applicant: Tanway Technology (Huzhou) Co., Ltd., Huzhou City (CN)

(72) Inventors: Hongpeng Li, Beijing (CN); Ruitong Zheng, Beijing (CN); Shiwei Wang, Beijing (CN); Luofeng Shen, Beijing (CN)

(73) Assignee: Tanway Technology (Huzhou) Co., Ltd., Huzhou (CN)

( * ) Notice: Subject to any disclaimer, the term of this patent is extended or adjusted under 35 U.S.C. 154(b) by 155 days.

(21) Appl. No.: 18/730,764

(22) PCT Filed: Feb. 24, 2023

(86) PCT No.: PCT/CN2023/078240
§ 371 (c)(1),
(2) Date: Jul. 20, 2024

(87) PCT Pub. No.: WO2023/138697
PCT Pub. Date: Jul. 27, 2023

(65) Prior Publication Data

US 2025/0104192 A1 Mar. 27, 2025

(30) Foreign Application Priority Data

Jan. 20, 2022 (CN) ........................ 202210068113.X

(51) Int. Cl.
*G01S 17/86* (2020.01)
*G01S 17/58* (2006.01)
(Continued)

(52) U.S. Cl.
CPC ................ *G06T 5/50* (2013.01); *G01S 17/58* (2013.01); *G01S 17/86* (2020.01); *G01S 17/89* (2013.01);
(Continued)

(58) Field of Classification Search
CPC ............. G06T 5/50; G06T 2207/10028; G06T 2207/20221; G01S 17/58; G01S 17/86; G01S 17/89; G01S 7/4808
See application file for complete search history.

(56) References Cited

U.S. PATENT DOCUMENTS

2019/0098233 A1 3/2019 Gassend
2020/0402209 A1 12/2020 Talbert
2021/0003710 A1 1/2021 Tan

FOREIGN PATENT DOCUMENTS

CN 101083724 A 12/2007
CN 111736169 A 10/2020
(Continued)

OTHER PUBLICATIONS

The search report of family CN application No. 202210068113X issue on Mar. 17, 2022.

*Primary Examiner* — Edward Park
*Assistant Examiner* — Alexander Joseph Vaughn
(74) *Attorney, Agent, or Firm* — The Sun IP Law

(57) ABSTRACT

A scanning method and apparatus based on an image-laser fusion lidar system is provided. The method includes: acquiring exposure images and point cloud data; merging N frames of exposure images into a spliced image, wherein in the N frames of exposure images, an initial exposure timing of each frame of exposure image is different, and lateral resolution of each frame of exposure image is less than that of the spliced image, and N is a positive integer greater than 1; and fusing each frame of point cloud data, which is
(Continued)

acquired synchronously with a corresponding frame in the N frames, with the spliced image respectively.

10 Claims, 3 Drawing Sheets

(51) Int. Cl.
*G01S 17/89* (2020.01)
*G06T 5/50* (2006.01)

(52) U.S. Cl.
CPC ............... *G06T 2207/10028* (2013.01); *G06T 2207/20221* (2013.01)

(56) References Cited

FOREIGN PATENT DOCUMENTS

| | | | |
|---|---|---|---|
| CN | 111951306 | A | 11/2020 |
| CN | 112288642 | A | 1/2021 |
| CN | 112346073 | A | 2/2021 |
| CN | 112561841 | A | 3/2021 |
| CN | 112738410 | A | 4/2021 |
| CN | 112753212 | A | 5/2021 |
| CN | 112953670 | A | 6/2021 |
| CN | 112969037 | A | 6/2021 |
| CN | 113902662 | A | 1/2022 |
| CN | 114089373 | A | 2/2022 |

SCANNING METHOD AND APPARATUS BASED ON IMAGE-LASER FUSION LIDAR SYSTEM

CROSS-REFERENCE TO RELATED APPLICATION

The present disclosure claims priority to Chinese Patent Application No. 202210068113.X, filed to the China National Intellectual Property Administration on Jan. 20, 2022 and entitled "Scanning Method and Apparatus Based on Image-laser Fusion lidar System", the disclosure of which is hereby incorporated by reference in its entirety.

TECHNICAL FIELD

The present disclosure relates to the technical field of photoelectric measurement, and in particular to a scanning method and apparatus based on an image-laser fusion lidar system.

BACKGROUND

A laser lidar system used in fields such as autonomous driving usually needs to meet higher ranging distance, precision, resolution, detection rate, and other indicators at the same time. Although laser lidar has the advantages such as precise distance perception and less susceptibility to environmental interference, it also has disadvantages, including sparse data and low detail clarity. Therefore, for the entire measurement system, a multi-sensor fusion technology that uses the complementary characteristics of various sensors, especially the fusion of a laser lidar point cloud and a camera image, to comprehensively improve the system's perception capability, is one of the important directions for the development of laser lidar perception systems. The image generated by the camera has the advantages such as high resolution, clear details, and comprehensive recognition algorithm functionality, but it exhibits poor detection capability in the dark and rainy or snowy weather. Therefore, the strong complementary characteristics between the laser lidar and the camera make a point cloud-image fusion model more effective and popular than other sensor fusion configurations.

However, in an image-laser fusion lidar system, for an image data part, a frame rate and lateral resolution of the system determine the maximum exposure time of each frame of the image, and for an image sensor currently used in the image-laser fusion lidar system, the frame rate of the system limits the maximum exposure time during image data acquisition. However, the maximum exposure time at present cannot meet the requirements for image quality, resulting in low quality of image data acquired by the existing image-laser fusion lidar system, which fails to meet the requirements for image quality in most usage scenarios.

SUMMARY

(1) Technical Problem to be Solved

The technical problem to be solved by the present disclosure is the low quality of image data acquired by the existing image-laser fusion lidar system, which fails to meet the requirements for image quality in most usage scenarios.

(2) Technical Solution

In order to solve the above technical problems, embodiments of the present disclosure provide a scanning method and apparatus based on an image-laser fusion lidar system.

The embodiments of the present disclosure provide a scanning method based on an image-laser fusion lidar system. The method includes:

Acquiring exposure images and point cloud data;

Merging N frames of exposure images into a spliced image;

Wherein in the N frames of exposure images, an initial exposure timing of each frame of exposure image is different, and lateral resolution of each frame of exposure image is less than that of the spliced image, and N is a positive integer greater than 1;

Fusing each frame of point cloud data, which is acquired synchronously with a corresponding frame in the N frames, with the spliced image respectively.

In some embodiments, the step of merging N frames of exposure images into a spliced image includes:

During the scan of the (N−1)th frame, performing an exposure every first preset time interval;

During the scan of the Nth frame, performing an exposure every second preset time interval;

Wherein an absolute value of a difference between the first preset time interval and the second preset time interval is less than or equal to a third preset time interval;

Merging the (N−1)th frame of exposure image and the Nth frame of exposure image into the spliced image.

In some embodiments, the step of fusing each frame of point cloud data acquired synchronously in the N frames with the spliced image respectively includes:

Fusing the (N−1)th frame of point cloud data with the spliced image;

Fusing the Nth frame of point cloud data with the spliced image.

In some embodiments, the method further includes: after fusing each frame of point cloud data, which is acquired synchronously with a corresponding frame in the N frames, with the spliced image respectively, Acquiring a velocity of movement of a moving object to be detected.

In some embodiments, the step of acquiring a velocity of movement of a moving object to be detected includes:

Acquiring a horizontal displacement and a vertical displacement of the moving object to be detected;

Determining a depth displacement of the moving object to be detected, according to the horizontal displacement and the vertical displacement.

Determining a compensation value of the horizontal displacement, according to the depth displacement and a difference between angles of direction of two adjacent frames.

Determining the velocity of movement of the moving object to be detected, according to the compensation value of the horizontal displacement.

In some embodiments, the method further includes: determining a reference depth value of the compensation value of the horizontal displacement according to the depth displacement.

A relationship between the compensation value x' of the horizontal displacement and the reference depth value Z' of the compensation value of the horizontal displacement satisfies:

$$x' = \frac{Z'}{2}R$$

Where R is the difference between angles of direction of two adjacent frames.

In some embodiments, the velocity of movement v of the moving object to be detected satisfies:

$$v = S\sqrt{(\Delta x - x')^2 + \Delta y^2 + \Delta z^2}$$

Where Δx is the horizontal displacement, Δy is the vertical displacement, Δz is the depth displacement, and S is a scanning frame rate of the image-laser fusion lidar system.

In some embodiments, the method further includes: after determining the depth displacement of the moving object to be detected according to the horizontal displacement and the vertical displacement, Acquiring a direction of movement of the moving object to be detected.

In some embodiments, the step of acquiring a direction of movement direction of the moving object to be detected includes:

Determining the direction of movement of the moving object to be detected, according to the horizontal displacement, the vertical displacement, and the depth displacement.

The embodiments of the present disclosure further provide a scanning apparatus based on an image-laser fusion lidar system. The apparatus includes a data acquisition module, an image data merging module, and an image-point cloud data fusion module.

The data acquisition module is configured to acquire exposure images and point cloud data.

The image data merging module is configured to merge N frames of exposure images into a spliced image. In the N frames of exposure images, an initial exposure timing of each frame of exposure image is different, and lateral resolution of each frame of exposure image is less than that of the spliced image, and N is a positive integer greater than 1.

The image-point cloud data fusion module is configured to respectively fuse each frame of point cloud data acquired synchronously in the N frames with the spliced image.

(3) Beneficial Effect

Compared with the related art, the technical solution provided by the embodiments of the present disclosure has the following advantages.

The scanning method based on the image-laser fusion lidar system provided by the embodiments of the present disclosure may improve the lateral resolution of acquired image data without changing a device or adjusting a system architecture, thereby acquiring image-laser fusion data meeting the requirements.

It is to be understood that the above general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate embodiments consistent with the application and, together with the description, serve to explain the principles of the present disclosure.

In order to more clearly illustrate the embodiments of the present disclosure or the technical solutions in related art, the accompanying drawings used in the description of the embodiments or the related art will be briefly described below. It is apparent that other accompanying drawings may further be obtained by those of ordinary skill in the art according to these accompanying drawings without creative efforts.

DETAILED DESCRIPTION OF THE EMBODIMENTS

In order to make objectives, technical solutions, and advantages of embodiments of the present disclosure clearer, the technical solutions in the embodiments of the present disclosure will be clearly and completely described below. It is apparent that the described embodiments are only part of the embodiments of the present disclosure, not all the embodiments. All other embodiments obtained by those of ordinary skill in the art on the basis of the embodiments in the present disclosure without creative work shall fall within the scope of protection of the present disclosure.

Figure 1:
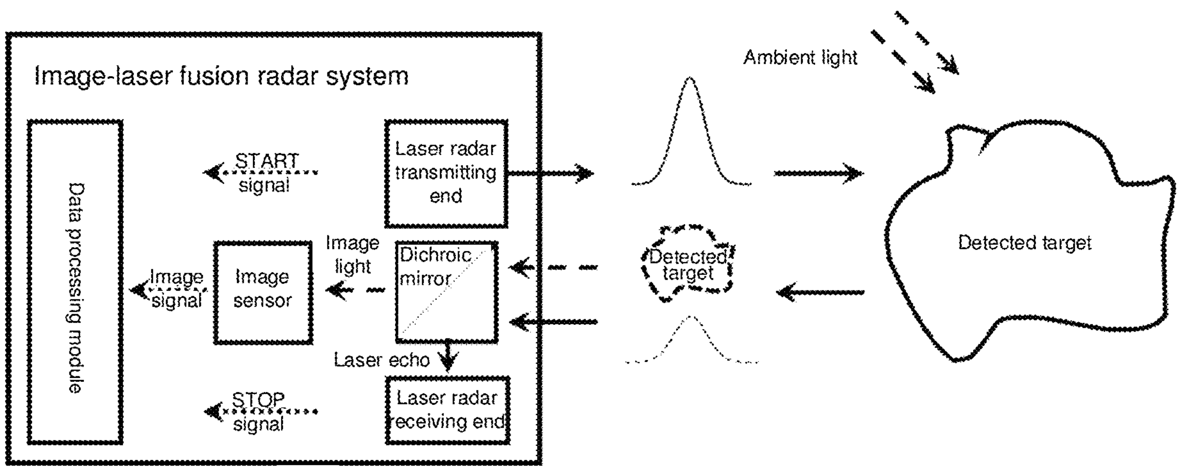
FIG. 1 is a schematic structural diagram of an image-laser fusion lidar system in related art.

In related art, as shown in FIG. 1, FIG. 1 is a schematic structural diagram of an image-laser fusion lidar system. The system structure is a fusion system of laser detection and image detection. In FIG. 1, the structure of the image-laser fusion lidar system is composed of a laser lidar transmitting end, a laser lidar receiving end, and a data processing module. The laser lidar transmitting end emits a laser for ranging, which can be either pulsed light or continuous light. The pulse waveform shown in FIG. 1 is only for illustration. After being reflected by a detected target, the laser for measurement is reflected to a photodetector of the laser lidar receiving end through a dichroic mirror thereby completing a measurement. An image sensor and the laser lidar receiving end are arranged in a mirror-symmetrical manner along a plane where the dichroic mirror receives an echo signal. The dichroic mirror, also known as a bi-color mirror, achieves the performance of almost complete transmission of light in a certain band and almost complete reflection of light in a certain band by coating a reflective surface thereof. The dichroic mirror selected in the system structure shown in FIG. 1 may almost completely reflect monochromatic infrared light (at wavelengths such as at 860 nm, 905 nm, 1064 nm or 1550 nm) for lidar ranging, and almost completely transmit a visible light band (380 to 780 nm) for imaging of the image sensor.

During the measurement process, the laser lidar transmitting end sends a START signal of the same phase to the data processing module while emitting the laser for measurement, in order to record an initial state at the beginning of the measurement. The initial state is a light pulse timing point or an initial phase of the continuous light. After the laser echo reaches the laser lidar receiving end, the photodetector also sends a STOP signal, which is generated by performing photoelectric conversion on the laser echo, to the data processing module, in order to record a final state when the measurement is completed. Once the calculation of distance and even speed information included in the START signal and the STOP signal is completed, a ranging result of the image-laser fusion lidar system is obtained. Through cooperating with at least one of an array detector and a scanning system, complete detection of a lidar field of view can be accomplished, and a target point cloud is generated.

An image detection part is composed of an image sensor and a corresponding data processing module. Under the irradiation of external ambient light (either natural light or artificial light), the visible light reflected by the detected target is transmitted to the image sensor through the dichroic mirror, thereby completing one-time imaging. The image sensor generates an image signal after performing photoelectric conversion on the image light, and sends it to the data processing module, thereby enabling real-time imaging.

Figure 2:
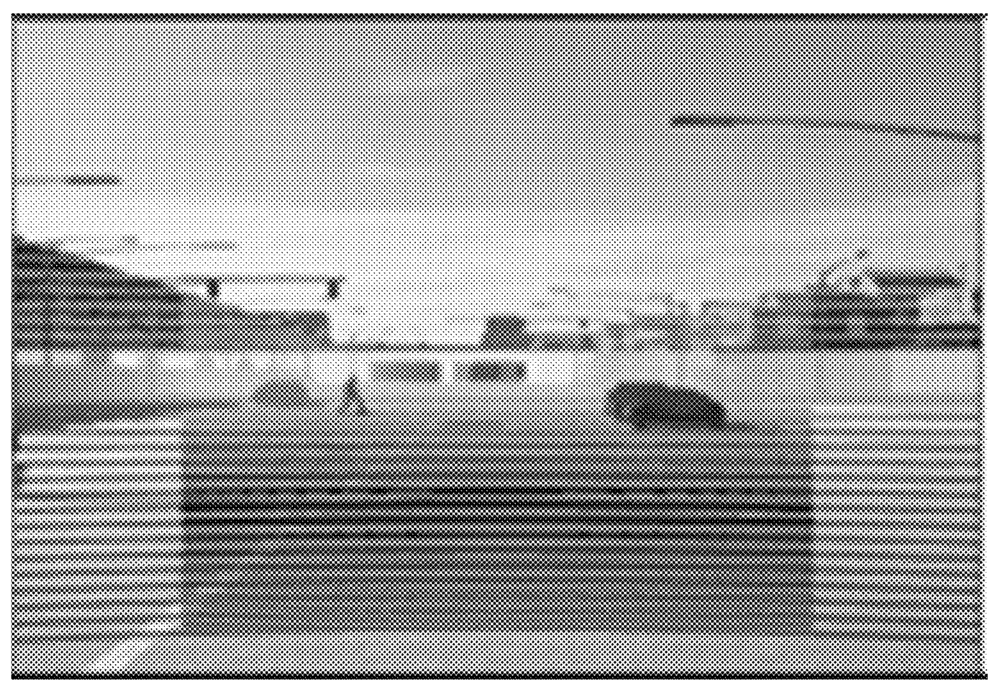
FIG. 2 is a fusion effect diagram of an image-laser fusion lidar in related art.

After the lidar point cloud of laser detection and the image of the image sensor are spatially aligned and time synchronized, the image fusion effect diagram shown in FIG. 2 may be achieved. Horizontal line data in FIG. 2 is data of the lidar point cloud, where the color of the lidar point cloud represents the proximity of the actual measured distance, with warmer colors representing longer distances and colder colors representing shorter distances. At the same time, the density of the lidar point cloud is increased in the middle field of view, so as to obtain higher longitudinal resolution of the point cloud in a Region of Interest (ROI) part.

Here, taking a longitudinal linear array photodetector (such as a 1×64 linear photodetector), a longitudinal linear array image sensor (such as a 1×1024 linear Complementary Metal Oxide Semiconductor (CMOS) sensor), and a lateral scanning system (such as a rotating mirror or a Micro-Electro-Mechanical System (MEMS) galvanometer) as an example, a longitudinal angle of field of view of the image and the lidar point cloud is achieved by the linear array sensor. The photodetector and the image detector share a receiving optical system. Moreover, the working distances of the photodetector and the image detector are the same, ensuring that the fields of view of the two coincide. In practical applications, it is not necessarily required that the angles of fields of view of the point cloud and the image completely coincide, and only stable alignment of the two fields of view needs to be ensured, that is, the corresponding relationship between pixels needs to be stable and unchanged. Lateral angles of fields of view of the two are achieved through a shared lateral scanning system. Finally, at a scanning frequency of 20 Hz, resolution of the field of view of the laser lidar of 960*64 and image resolution of 960*1024 may be achieved. 960-line is the measurement frequency of the photodetector and the image detector within the field of view during the lateral scanning process. The measurement frequency may be adjusted according to the shortest measurement period of the system used.

The single measurement time of the photodetector is mainly limited by a measured distance (divided by a speed of light) and a time for distance calculation of the data processing module, and can usually be compressed to 20 μs or even less than 10 μs under the current extreme measurement distance requirements of hundreds of meters. Different from the photodetector, the image detector requires sufficient exposure time to obtain images of sufficient quality during the image acquisition process, which usually takes tens, hundreds of s or even longer. Therefore, for the image-laser fusion lidar system, in improving the scanning frame rate and the lateral resolution, there may be the problem that the acquisition cycle required for the image signal is too long to meet the requirement, that is, the image-laser fusion lidar system faces the problem that the image system part restricts both the frame rate and the lateral resolution of the system.

Figure 3:
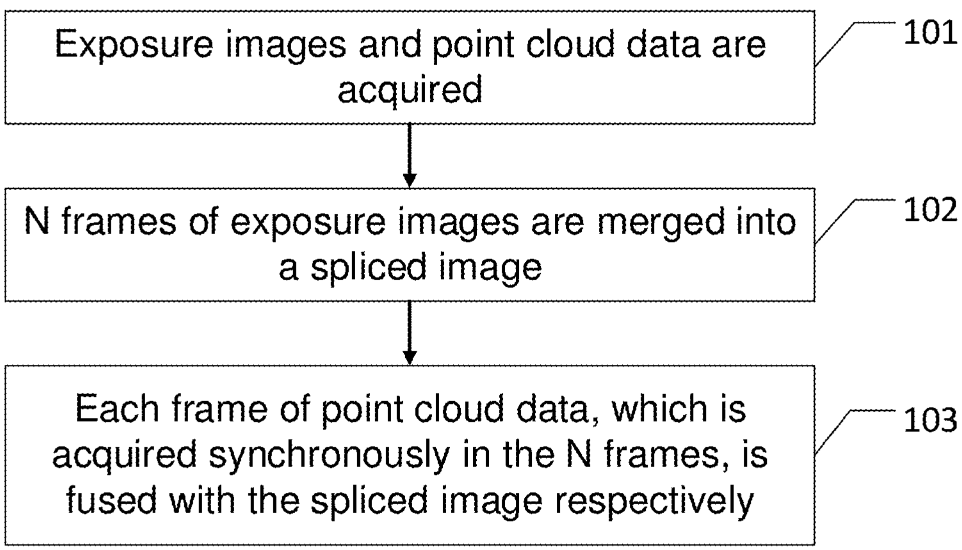
FIG. 3 is a schematic flowchart of a scanning method based on an image-laser fusion lidar system according to an embodiment of the present disclosure.

In view of at least one of the above problems, the embodiments of the present disclosure provide a scanning method based on an image-laser fusion lidar system. The method may be performed by the image-laser fusion lidar system shown in FIG. 1. As shown in FIG. 3, FIG. 3 is a schematic flowchart of a scanning method based on an image-laser fusion lidar system according to an embodiment of the present disclosure. As can be seen from FIG. 3, the method includes the following steps.

At S101, exposure images and point cloud data are acquired.

At S102, N frames of exposure images are merged into a spliced image.

In the N frames of exposure images, an initial exposure timing of each frame of exposure image is different, and lateral resolution of each frame of exposure image is less than that of the spliced image, and N is a positive integer greater than 1.

In S102, in the N frames of exposure images that are merged into the spliced image, the N frames of exposure images may be, for example, two frames of exposure images, three frames of exposure images, or more frames of exposure images. The lateral resolution of each frame of exposure image in the N frames of exposure images is less than that of the spliced image.

At S103, each frame of point cloud data, which is acquired synchronously in the N frames, is respectively fused with the spliced image.

The scanning method based on the image-laser fusion lidar system provided by the embodiments of the present disclosure may improve the lateral resolution of acquired image data without changing a device or adjusting a system architecture, thereby acquiring image-laser fusion data meeting the requirements.

In some embodiments, S101 of acquiring the exposure images and the point cloud data further includes, for example, acquiring the exposure images and the point cloud data synchronously. That is, N frames of exposure data and N frames of point cloud data are acquired synchronously. The exposure data and the point cloud data are acquired synchronously, so that the acquired exposure data and point cloud data are directed to the same detected target, which can simplify the complexity of the subsequent fusion of image data and point cloud data, and simultaneously improve the precision of fusion.

In some embodiments, the N frames of exposure images are merged into the spliced image, and the lateral resolution of each frame of exposure image in the N frames of exposure images may be the same or different. Specifically, flexible adjustment may be performed according to the actual detection requirements, which may improve the diversity of the scanning method of the image-laser fusion lidar system, thereby meeting different detection requirements.

Moreover, since the initial exposure timing of each frame of exposure image is different, image information acquired by each frame of exposure image is different, and at this time, the N frames of exposure images containing different image information are merged into the spliced image, and the lateral resolution of the spliced image may be increased. Compared with the related art, the scanning time for acquiring each frame of exposure image remains unchanged, but the lateral resolution of each frame of exposure image is reduced, so that the time of each exposure in the scanning process of each frame may be increased. Increasing the exposure time may obtain more image information, thereby improving the quality of the entire exposure image. By merging the N frames of exposure images into the spliced image, the spliced image obtained can not only ensure the required lateral resolution, but also improve the quality of the spliced image.

In some embodiments, the lateral resolution of each frame of point cloud data simultaneously acquired in the N frames is the same as that of the spliced image. In this way, the fusion of the point cloud data with the spliced image may be facilitated. Since the lateral resolution of the point cloud data is the same as that of the spliced data, the fusion of the point cloud data with the spliced image may be achieved without complex data conversion, and thus the data fusion process is simple, and the precision is high.

Figure 4:
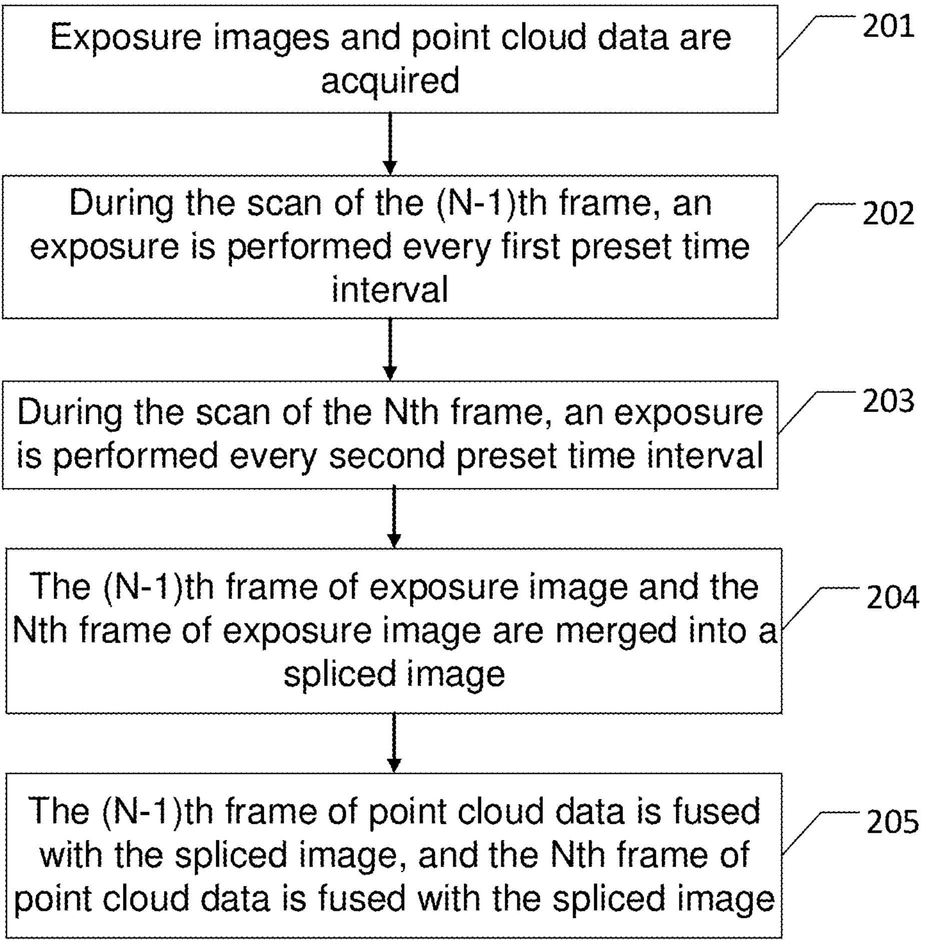
FIG. 4 is another schematic flowchart of a scanning method based on an image-laser fusion lidar system according to an embodiment of the present disclosure.

The above is only one implementation of the present disclosure. The implementation of the present disclosure may also be shown in FIG. 4. FIG. 4 is another schematic flowchart of a scanning method based on an image-laser fusion lidar system according to an embodiment of the present disclosure. As can be seen from FIG. 4, the method includes the following steps.

At S201, exposure images and point cloud data are acquired.

At S202, during the scan of the (N−1)th frame, exposure is performed every first preset time interval.

At S203, during the scan of the Nth frame, exposure is performed every second preset time interval.

An absolute value of a difference between the first preset time interval and the second preset time interval is less than or equal to a third preset time interval.

In some embodiments, the third preset time interval is greater than or equal to zero. When the third preset time interval is 0, it indicates that the lateral resolution of the (N−1)th frame of exposure image is the same as that of the Nth frame of exposure image. When the third preset time interval is greater than 0, it indicates that the lateral resolution of the (N−1)th frame of exposure image is different from that of the Nth frame of exposure image.

A value of the third preset time interval is set according to the actual requirements of the scanning method based on the image-laser fusion lidar system, which is not limited in the present disclosure.

At S204, the (N−1)th frame of exposure image and the Nth frame of exposure image are merged into a spliced image.

At S205, the (N−1)th frame of point cloud data is fused with the spliced image, and the Nth frame of point cloud data is fused with the spliced image.

In the embodiment of the present disclosure, two frames of exposure images are merged into the spliced image, and two frames of point cloud data are fused with the spliced image, so that the technical problem that the exposure time of the image system part restricts both the frame rate and the lateral resolution of the system in the related art may be addressed without changing a device or adjusting the system architecture.

Taking two frames of exposure images to be merged into the spliced image as an example, and the longitudinal linear array sensor shown in FIG. 1 cooperates with the image-laser fusion lidar system of the lateral scanning system. For each frame of point cloud and image, a lidar part forms a point cloud through the column-by-column scanning of a linear array detector in a horizontal direction, and an image part is spliced to form an image through the synchronous column-by-column scanning of a linear array image sensor. Therefore, for the image part, the frame rate and the lateral resolution of the system determine the maximum exposure time of each frame thereof. By taking a 20 Hz frame rate, a 120° lateral field of view, and 960-line lateral resolution as an example, the time of each exposure needs to be limited within 17.4 μs, and for an image sensor currently used in the system, an exposure time of at least 25 μs is required to meet the requirements for image quality in most usage scenarios.

Therefore, for the contradiction between the above-mentioned measurement indicators and parameters, according to the scanning method based on the image-laser fusion lidar system provided by the embodiment of the present disclosure, the number of exposures of the image sensor in each frame is halved. For example, the (N−1)th frame is exposed in the original odd-numbered exposure columns (i.e., the 1st, 3th, 5th, . . . , 957th, or 959th exposure column). If each frame is exposed 480 times, the time limit for each exposure may be increased to 34.8 μs, which may meet the requirement of the minimum exposure time of 25 μs. However, since the number of exposures is halved at this time, the lateral resolution of each frame may be reduced by half, which cannot meet the expected resolution indicator requirements. Therefore, in the scanning of the next frame, exposure is performed in the even-numbered exposure columns. For example, the Nth frame is exposed in the original even-numbered exposure columns (i.e., the 2rd, 4th, 6th, . . . , 958th, or 960th exposure column). Then the two frames of images are merged to achieve the expected 960-line lateral resolution. For the entire lidar scanning system, the lidar part completes two 960-line scans in two frames, and the image part completes a complete 960-line scan. By sharing the same image in two frames, the required measurement indicators are achieved.

Figure 5:
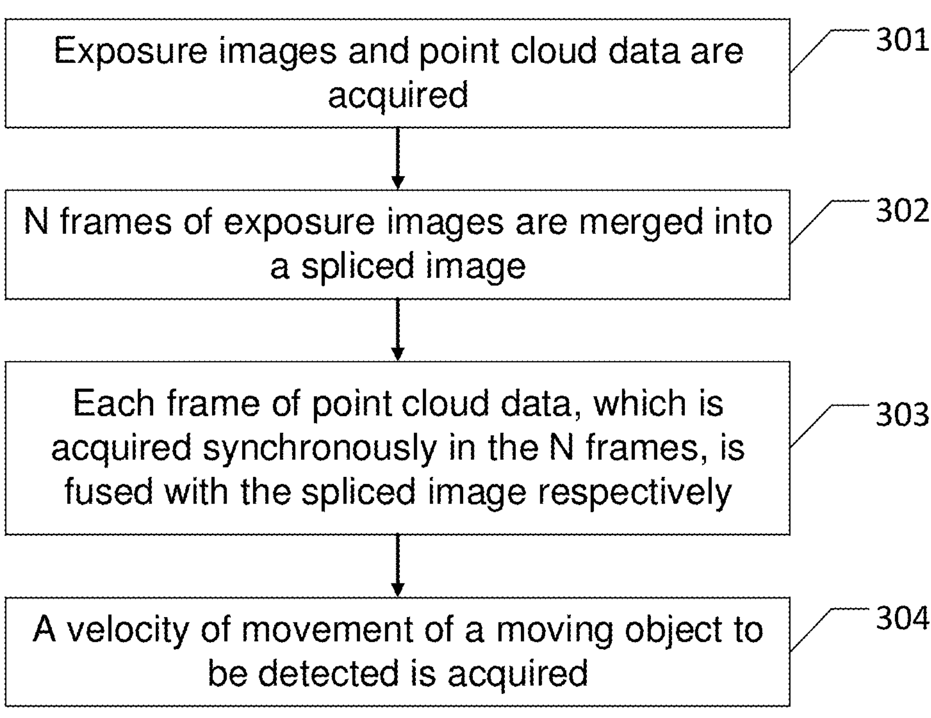
FIG. 5 is still another schematic flowchart of a scanning method based on an image-laser fusion lidar system according to an embodiment of the present disclosure.

The above is only one implementation of the present disclosure. The implementation of the present disclosure may also be shown in FIG. 5. FIG. 5 is still another schematic flowchart of a scanning method based on an image-laser fusion lidar system according to an embodiment of the present disclosure. As can be seen from FIG. 5, the method includes the following steps.

At S301, exposure images and point cloud data are acquired.

At S302, N frames of exposure images are merged into a spliced image.

In the N frames of exposure images, an initial exposure timing of each frame of exposure image is different, and lateral resolution of each frame of exposure image is less than that of the spliced image, and N is a positive integer greater than 1.

At S303, each frame of point cloud data, which is acquired synchronously in the N frames, is respectively fused with the spliced image.

At S304, a velocity of movement of a moving object to be detected is acquired.

The scanning method based on the image-laser fusion lidar system provided by embodiments of the present disclosure may, for example, synchronously acquire the velocity of movement of the moving object to be detected based on an image recognition algorithm.

In some embodiments, S304 of acquiring the velocity of movement of the moving object to be detected further includes, for example, that: a horizontal displacement and a vertical displacement of the moving object to be detected are acquired; a depth displacement of the moving object to be detected is determined according to the horizontal displacement and the vertical displacement; a compensation value of the horizontal displacement is determined according to the depth displacement and a difference between angles of direction of two adjacent frames; and the velocity of movement of the moving object to be detected is determined according to the compensation value of the horizontal displacement.

Taking a 20 Hz frame rate, a 120° lateral field of view, and 960-line lateral resolution as an example, two frames of 480-line images are merged to obtain a spliced image with the 960-line lateral resolution. A certain delay exists between the two frames of 480-line images. Taking the 20 Hz frame rate as an example, the delay here is 50 ms. Since the delay is known and fixed, and the difference between angles of direction of the two adjacent frames is lateral angular resolution of the image part (that is, 120°/960=0.125°), the velocity of movement may be calculated through the actual displacement of the moving object to be detected between the two frames. For images with higher resolution (such as longitudinal 1024-line), there are currently many mature image recognition algorithms that may accurately determine the appearance of the object. Therefore, through the recognition algorithm, feature points may be selected on the moving object to obtain accurate horizontal and vertical displacements, and then the displacement in the depth direction may be obtained with the help of the laser lidar ranging values of feature points in two corresponding frames. Then, based on the depth displacement and the difference between angles of direction of the two adjacent frames, the compensation value (configured to compensate for a system deviation introduced by exposure positions not being identical) of the horizontal displacement is acquired. After the compensation is completed, the accurate direction of movement and velocity of movement of the moving object may be obtained based on the displacement and the aforementioned exposure delay.

Take a certain feature point A of the moving object as an example, horizontal and vertical coordinates of point A, which may be obtained from the two frames of images, are x1, y1 and x2, y2 respectively. An effective measurement point closest to the feature point is selected on the lidar point cloud, and coordinates z1 and z2 in the depth direction may be obtained. Then the horizontal displacement is $\Delta x = x1 - x2$, the vertical displacement is $\Delta y = y1 - y2$, and the depth displacement is $\Delta z = z1 - z2$. $(z1+z2)/2$ is taken as the reference depth value Z' of the compensation value of the horizontal displacement.

In some embodiments, the method further includes determining a reference depth value of the compensation value of the horizontal displacement according to the depth displacement. For example, $(z1+z2)/2$ is taken as the reference depth value Z' of the compensation value of the horizontal displacement.

A relationship between the compensation value x' of the horizontal displacement and the reference depth value Z' of the compensation value of the horizontal displacement satisfies:

$$x' = \frac{Z'}{2} R$$

Where R is the difference between angles of direction of two adjacent frames, and the unit of R is in radians.

In some embodiments, the velocity of movement v of the moving object to be detected satisfies:

$$v = s\sqrt{(\Delta x - x')^2 + \Delta y^2 + \Delta z^2}$$

Where $\Delta x$ is the horizontal displacement, $\Delta y$ is the vertical displacement, $\Delta z$ is the depth displacement, and s is a scanning frame rate of the image-laser fusion lidar system.

In some embodiments, after the depth displacement of the moving object to be detected is determined according to the horizontal displacement and the vertical displacement, the method further includes, for example, acquiring a direction of movement of the moving object to be detected.

In some embodiments, the operation of acquiring the direction of movement of the moving object to be detected further includes, for example, determining the direction of movement of the moving object to be detected, according to the horizontal displacement, the vertical displacement, and the depth displacement. The direction of movement of the moving object to be detected may be, for example, determined by a direction of a space vector determined by the horizontal displacement, the vertical displacement, and the depth displacement in a lidar coordinate system known to those skilled in the art.

The scanning method based on the image-laser fusion lidar system provided by embodiments of the present disclosure not only addresses the problem that the exposure time of the image system part restricts the improvement of the frame rate and the lateral resolution of the system, but also, with the help of image recognition algorithm, achieves a more accurate speed measurement function based on the scanning method proposed in the present disclosure.

Figure 6:
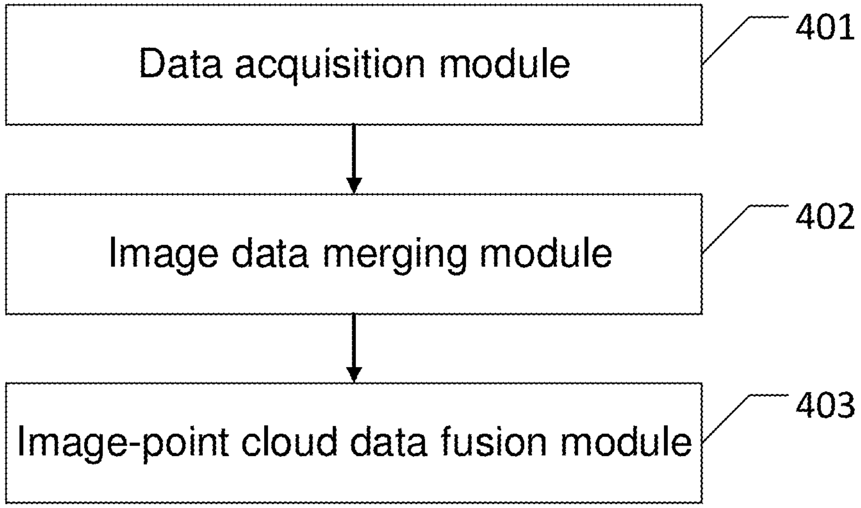
FIG. 6 is a schematic structural diagram of a scanning apparatus based on an image-laser fusion lidar system according to an embodiment of the present disclosure.

The embodiments of the present disclosure further provide a scanning apparatus based on an image-laser fusion lidar system. As shown in FIG. 6, FIG. 6 is a schematic structural diagram of a scanning apparatus based on an image-laser fusion lidar system according to an embodiment of the present disclosure. The apparatus includes: a data acquisition module 401, configured to acquire exposure images and point cloud data; an image data merging module 402, configured to merge N frames of exposure images into a spliced image, where in the N frames of exposure images, an initial exposure timing of each frame of exposure image is different, and lateral resolution of each frame of exposure image is less than that of the spliced image, and N is a positive integer greater than 1; and an image-point cloud data fusion module 403, configured to respectively fuse each frame of point cloud data acquired synchronously in the N frames with the spliced image.

In some embodiments, the data acquisition module 401 is, for example, further configured to synchronously acquire the exposure images and the point cloud data, that is, synchronously acquire N frames of exposure data and N frames of point cloud data. The exposure data and the point cloud data are acquired synchronously, so that the acquired exposure data and point cloud data are directed to the same detected target, which may simplify the complexity of the subsequent fusion of image data and point cloud data, and at the same time improve the precision of fusion.

In some embodiments, the image data merging module 402 is, for example, configured to enable, in the N frames of exposure images that are merged into the spliced image, the N frames of exposure images to be, for example, two frames of exposure images, three frames of exposure images, or more frames of exposure images. The lateral resolution of each frame of exposure image in the N frames of exposure images is less than that of the spliced image.

In some embodiments, the image data merging module 402 is, for example, configured to merge the N frames of exposure images into the spliced image. The lateral resolution of each frame of exposure image in the N frames of exposure images may be the same or different. Specifically, flexible adjustment may be performed according to the actual detection requirements, which may improve the diversity of the scanning method of the image-laser fusion lidar system, thereby meeting different detection requirements.

Moreover, since the initial exposure timing of each frame of exposure image is different, image information acquired by each frame of exposure image is different, and at this time, the N frames of exposure images containing different image information are merged into the spliced image, and the lateral resolution of the spliced image is increased. Compared with the related art, the scanning time for acquiring each frame of exposure image remains unchanged, but the lateral resolution of each frame of exposure image is reduced, so that the time of each exposure in the scanning process of each frame may be increased. Increasing the exposure time may obtain more image information, thereby improving the quality of the entire exposure image. By merging the N frames of exposure images into the spliced image, the spliced image obtained can not only ensure the required lateral resolution, but also improve the quality of the spliced image.

In some embodiments, the lateral resolution of each frame of point cloud data simultaneously acquired in the N frames is the same as that of the spliced image. In this way, the fusion of the point cloud data with the spliced image may be facilitated. Since the lateral resolution of the point cloud data is the same as that of the spliced data, the fusion of the point cloud data with the spliced image may be achieved without complex data conversion, and thus the data fusion process is simple, and the precision is high.

The scanning apparatus based on the image-laser fusion lidar system further includes, for example, a moving object speed measurement module which is configured to acquire a velocity of movement of the moving object to be detected.

In some embodiments, the moving object speed measurement module is, for example, further configured to acquire a horizontal displacement and a vertical displacement of the moving object to be detected; determine a depth displacement of the moving object to be detected, according to the horizontal displacement and the vertical displacement; determine a compensation value of the horizontal displacement, according to the depth displacement and a difference between angles of direction of two adjacent frames; and determine the velocity of movement of the moving object to be detected according to the compensation value of the horizontal displacement.

In some embodiments, the moving object speed measurement module is, for example, further configured to acquire a direction of movement of the moving object to be detected.

In some embodiments, the moving object speed measurement module is, for example, further configured to determine the direction of movement of the moving object to be detected according to the horizontal displacement, the vertical displacement, and the depth displacement. The direction of movement of the moving object to be detected may be determined, for example, by the direction of a space vector which is determined by the horizontal displacement, the vertical displacement, and the depth displacement in a lidar coordinate system, as is known to those skilled in the art.

The scanning apparatus based on the image-laser fusion lidar system provided by embodiments of the present disclosure not only addresses the problem that the exposure time of the image system part restricts the improvement of the frame rate and the lateral resolution of the system, but also, with the help of image recognition algorithm, achieves a more accurate speed measurement function based on the scanning method proposed in the present disclosure.

The scanning method and apparatus based on the image-laser fusion lidar system provided in the present disclosure are described in detail above. The principles and implementations of the present disclosure are described herein using specific examples, the foregoing description of the examples are only used to help the understanding of the method and core concept of the present disclosure. At the same time, for those of ordinary skill in the art, according to the concept of the present disclosure, there will be changes in the specific implementation modes and the application scope. In summary, the contents of the present description should not be construed as limiting the present disclosure.

It is to be noted that relational terms “first”, “second” and the like herein are adopted only to distinguish one entity or operation from another entity or operation and not always to require or imply existence of any such practical relationship or sequence between the entities or operations. Furthermore, terms “include” and “contain” or any other variant thereof is intended to cover nonexclusive inclusions herein, so that a process, method, object or device including a series of elements not only includes those elements but also includes other elements which are not clearly listed or further includes elements intrinsic to the process, the method, the object or the device. Under the condition of no more limitations, an element defined by the statement “including a/an . . . ” does not exclude existence of the same other elements in a process, method, object or device including the element.

The above is only the specific implementation of the present disclosure, which causes those skilled in the art to understand or implement the present disclosure. Various modifications to these embodiments will be apparent to those skilled in the art, and the general principles defined herein may be implemented in other embodiments without departing from the spirit or scope of the present disclosure. Therefore, the present disclosure will not be limited to the embodiments shown herein, but is within the widest scope consistent with the principles and novel features disclosed herein.

INDUSTRIAL APPLICABILITY

A scanning method based on an image-laser fusion lidar system provided by the present disclosure may improve lateral resolution of acquired image data without changing a device or adjusting a system architecture, thereby acquiring image-laser fusion data meeting the requirements.

What is claimed is:

1. A scanning method based on an image-laser fusion lidar system, comprising:

acquiring exposure images and point cloud data;

merging N frames of exposure images into a spliced image;

wherein in the N frames of exposure images, an initial exposure timing of each frame of exposure image is different, and lateral resolution of each frame of exposure image is less than that of the spliced image, and N is a positive integer greater than 1; and fusing each frame of point cloud data, which is acquired synchronously with a corresponding frame in the N frames, with the spliced image respectively;

wherein scanning time for each frame of exposure image remains constant; by reducing the lateral resolution of each frame of exposure image, single exposure time during the scanning of each frame is increased.

2. The method as claimed in claim 1, wherein the merging N frames of exposure images into a spliced image comprises:

during the scan of the (N−1)th frame, performing an exposure every first preset time interval;

during the scan of the Nth frame, performing an exposure every second preset time interval;

wherein an absolute value of a difference between the first preset time interval and the second preset time interval is less than or equal to a third preset time interval; and merging the (N−1)th frame of exposure image and the Nth frame of exposure image into the spliced image.

3. The method as claimed in claim 2, wherein the fusing each frame of point cloud data, which is acquired synchronously with a corresponding frame in the N frames, with the spliced image respectively comprises:

fusing the (N−1)th frame of point cloud data with the spliced image; and fusing the Nth frame of point cloud data with the spliced image.

4. The method as claimed in claim 1, further comprising: after fusing each frame of point cloud data, which is acquired synchronously with a corresponding frame in the N frames, with the spliced image respectively, acquiring a velocity of movement of a moving object to be detected.

5. The method as claimed in claim 4, wherein the acquiring a velocity of movement of a moving object to be detected comprises:

acquiring a horizontal displacement and a vertical displacement of the moving object to be detected;

determining a depth displacement of the moving object to be detected, according to the horizontal displacement and the vertical displacement;

determining a compensation value of the horizontal displacement, according to the depth displacement and a difference between angles of direction of two adjacent frames; and determining the velocity of movement of the moving object to be detected according to the compensation value of the horizontal displacement.

6. The method as claimed in claim 5, further comprising: determining a reference depth value of the compensation value of the horizontal displacement according to the depth displacement;

a relationship between the compensation value x' of the horizontal displacement and the reference depth value Z' of the compensation value of the horizontal displacement satisfies:

$$x' = \frac{Z'}{2}R$$

where R is the difference between angles of direction of two adjacent frames.

7. The method as claimed in claim 6, wherein the velocity of movement v of the moving object to be detected satisfies:

$$v = S\sqrt{(\Delta x - x')^2 + \Delta y^2 + \Delta z^2}$$

where Δx is the horizontal displacement, Δy is the vertical displacement, Δz is the depth displacement, and S is a scanning frame rate of the image-laser fusion lidar system.

8. The method as claimed in claim 5, further comprising: after determining the depth displacement of the moving object to be detected according to the horizontal displacement and the vertical displacement, acquiring a direction of movement of the moving object to be detected.

9. The method as claimed in claim 8, wherein the acquiring a direction of movement of the moving object to be detected comprises:

determining the direction of movement of the moving object to be detected, according to the horizontal displacement, the vertical displacement, and the depth displacement.

10. A scanning apparatus based on an image-laser fusion lidar system, comprising:

a data acquisition module, configured to acquire exposure images and point cloud data;

an image data merging module, configured to merge N frames of exposure images into a spliced image, wherein in the N frames of exposure images, an initial exposure timing of each frame of exposure image is different, and lateral resolution of each frame of exposure image is less than that of the spliced image, and N is a positive integer greater than 1; and an image-point cloud data fusion module, configured to respectively fuse each frame of point cloud data acquired synchronously in the N frames with the spliced image;

wherein scanning time for each frame of exposure image remains constant; by reducing the lateral resolution of each frame of exposure image, single exposure time during the scanning of each frame is increased.

* * * * *